H. H. Fultz,
Cotton Press.
Nº 13,426.  Patented Aug. 14, 1855.
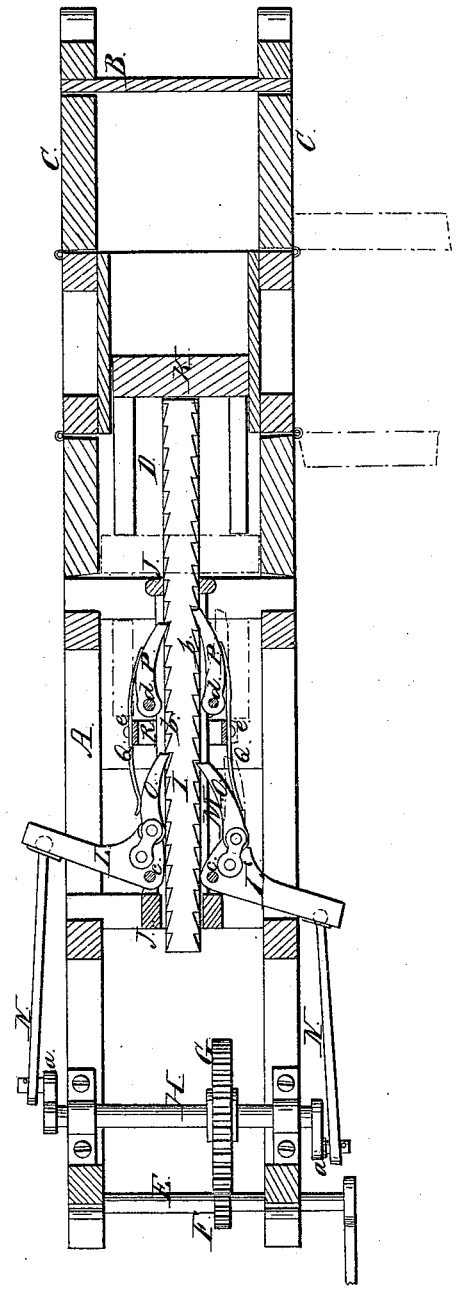

UNITED STATES PATENT OFFICE.

H. H. FULTZ, OF LEXINGTON, MISSISSIPPI.

IMPROVEMENT IN COTTON-PRESSES.

Specification forming part of Letters Patent No. 13,426, dated August 14, 1855.

*To all whom it may concern:*

Be it known that I, H. H. FULTZ, of Lexington, in the county of Holmes and State of Mississippi, have invented a new Improvement in Pawl-Gear Arrangements to the Rack-Bars of Cotton and other Presses; and I do hereby declare that the following is a full, clear, and exact description of the same, reference being had to the annexed drawing, making a part of this specification, said drawing being a horizontal section of my improvement, the plane of section being through the center.

To enable others skilled in the art to make and use my invention, I will proceed to describe its construction and operation.

A represents a suitable frame-work, at one end of which is a press-box, B, provided with suitable doors, C. D is a chamber adjoining the press-box, in which the loose cotton is placed. The chamber D is a trifle smaller as regards breadth and depth than the press-box, as will be seen by referring to the drawing. The frame A is placed in a horizontal position, and at the end opposite to where the press-box B is placed or secured there is hung a transverse driving-shaft, E, having upon it a pinion, F, which gears into a toothed wheel, G, on a shaft, H, which shaft is also hung on the frame A and parallel with the shaft E. At each end of the shaft H there is attached a crank, *a*, one being placed in a reverse position to the other.

I represents the follower-rod, which is of rectangular or square form, with teeth *b* cut in each side. The rod I is fitted or works through guides J J, attached to the frame A.

K represents the follower, which is fitted within the chamber D. The end of the rod I bears against the follower as the cotton is pressed, as will presently be shown; but the follower is not attached to the rod.

L L' are two levers, which are attached by pivots *c* to a plate, M, and near the outer end of the rod I. The outer ends of the levers L L' are attached to rods N N, which are connected to the cranks *a a* at the ends of the shaft H. To the opposite ends of the levers L L' there are attached pawls O O, one to each. These pawls catch into the teeth *b* of the rod I.

P P are pawls secured to the plate M by pivots *d*. These pawls also catch into the teeth *b* of the rod I.

Q Q are springs which are secured at their centers to the ends of a bar, R, by pivots *e*. The ends of these springs bear against the pawls O O P P and keep them in the teeth of the rack.

Operation: The springs Q Q are turned on the pivots *e* by hand and freed from the pawls O P, which are moved outward from the teeth of the rod I. The rod I is then shoved back in the chamber D, and also the follower K. The springs Q Q are then turned to their original position, so that their ends will bear against the pawls O P. The cotton is then placed in the chamber D, and motion is given the shaft E in any proper manner. The pawls O O P P then work alternately and force the rod I and follower K along within the chamber D, the follower K compressing the cotton within the box B. The pawls P P serve only to retain or hold the rod during the changing of the pawls O O, the latter serving as drivers. By this arrangement of the one spring Q on either side of the follower-rod or rack-bar, hung on a pivot intermediate of the retaining and driving pawls P and O, and made capable of turning on its pivot *e*, as described, not only is the one spring made to serve for keeping to their bite both the retaining and driving pawls, and, by its pressure on the two pawls at opposite ends of it, to neutralize loosening lateral strain of it on its pivot, but on turning the spring free of the pawls, as described, both the retaining and driving pawls are simultaneously and expeditiously liberated from their spring-bite with the follower-rod; or on turning the spring to the position shown in the drawing the said pawls are simultaneously put into spring-gear with the follower-rod, which simultaneous and quickly-changeable action on the two pawls serves materially to expedite the running back of the follower-rod, and of putting the pawls into operative gear with it, and thereby to reduce the time usually lost in pressing a number of bales in continuous succession.

I claim nothing new in the manner of operating the follower by rack bar or rod and pawls, as described, nor yet in the addition of retaining-pawls acting in concert with drivers, and am aware that the application of springs to the back of the pawls is old. Neither do I claim of itself arranging the springs so that the pawls may be relieved of their pressure; but

I do claim as new and useful herein and desire to secure by Letters Patent—

The arrangement, with the retaining and driving pawls P and O on either side of the follower-rod or rack-bar I, of the one spring Q, bearing at its opposite ends on the said pawls, and hung upon an intermediate pivot, e, in relation thereto, so that upon turning the spring, as described, both the retaining and driving pawls are expeditiously and simultaneously relieved from or thrown into spring-gear with the follower-rod, and the working of the follower in its reverse directions is expedited, as specified.

H. H. FULTZ.

Witnesses:
 Jos. Geo. Mason,
 Wm. Tusch.